Aug. 27, 1963  R. F. DYE  3,102,005
METHOD AMD APPARATUS FOR WET PELLETING CARBON BLACK
Filed June 19, 1961
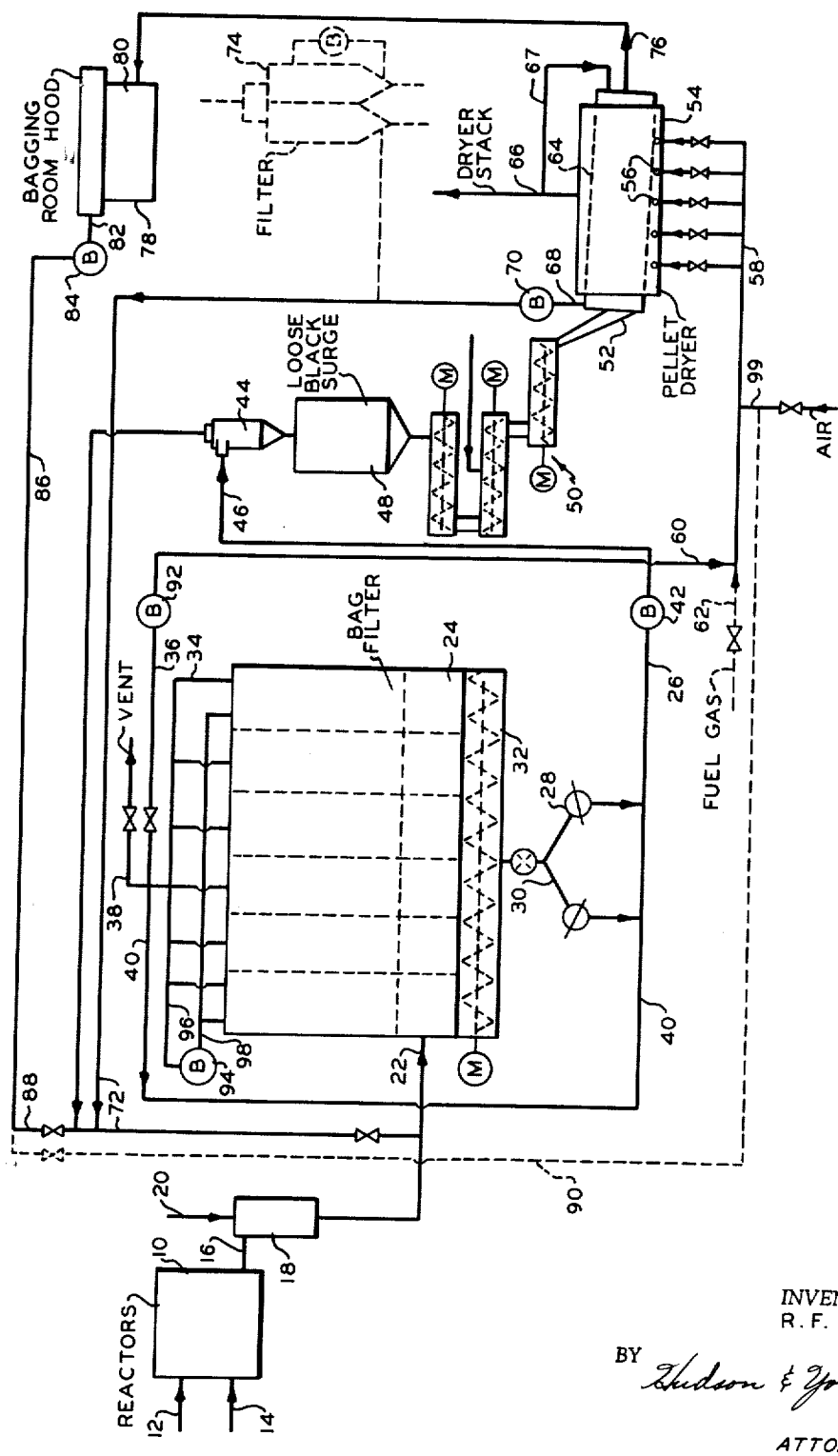
INVENTOR.
R. F. DYE
BY Hudson & Young
ATTORNEYS

United States Patent Office 3,102,005
Patented Aug. 27, 1963

3,102,005
METHOD AND APPARATUS FOR WET
PELLETING CARBON BLACK
Robert F. Dye, Bartlesville, Okla., assignor to Phillips
Petroleum Company, a corporation of Delaware
Filed June 19, 1961, Ser. No. 118,014
6 Claims. (Cl. 23—314)

This invention relates to a process and arrangement of apparatus for producing carbon black and pelleting the black.

In the production of carbon black by partial combustion of a suitable hydrocarbon feed to pyrolytically crack the unburned hydrocarbon, an effluent smoke stream containing carbon black is produced and passed thru a quench zone and thru a carbon black recovery system for loose black. A substantial part of the recovery system comprises a bag filter containing a plurality of bag compartments thru which the smoke is passed in parallel to recover substantially all of the carbon black therefrom. The off-gas from the bag filter has a B.t.u. content in the range of about 50 to 75 B.t.u. per cu. ft. and is generally vented to the atmosphere. This is wasteful of fuel components, particularly, in areas where fuel gas is at a premium.

The carbon black from the bag filter and other elements of the recovery system is conventionally passed thru wet pelletizers where the black is admixed with water and agitated to form wet pellets. The wet pellets are then transferred to a rotary drum dryer comprising a rotating drum within a furnace which is heated by burners positioned below the drum. Part of the combustion gas formed in the dryer is vented thru a stack and a substantial portion is passed thru the interior of the drum in contact with the pellets being tumbled therein to assist in drying the pellets but it picks up a substantial amount of carbon black dust. The effluent gas from the dryer drum, bearing entrained black, is conventionally passed thru a separate bag filter unit to recover black dust therefrom, principally because of the menace to the surrounding area from vented dust. However, the recovered dust is valuable product and it is advantageous to pass this dust into the wet pelletizers or another point in the system downstream of the bag filter.

This invention is concerned with a process and arrangement of apparatus which utilizes off-gas from the bag filter as fuel in the dryer and which recovers the carbon black dust in the effluent from the dryer drum in the main plant bag filter, thereby eliminating the extra bag filter in the effluent gas line from the drum dryer.

Accordingly, it is an object of the invention to provide an improved process and arrangement of apparatus for producing and pelleting carbon black. Another object is to make advantageous use of the combustible off-gas from the bag filter in a carbon black plant, which use makes it possible to eliminate the bag filter serving the drum dryer. A further object is to provide a process and apparatus arrangement which is more economical than conventional processes and arrangements of apparatus for carbon black production and pelleting. Other objects of the invention will become apparent upon consideration of the accompanying disclosure.

A broad aspect of the invention comprises passing a portion of the off-gas from a bag filter in a carbon black plant to the rotary drum dryer as fuel for heating the dryer, whereby the effluent gas from the interior of the drum, containing carbon black dust, when admixed with the smoke stream passing to the main bag filter, maintains an $O_2$ concentration in said stream substantially below the explosive limit. This not only utilizes conventionally wasted fuel gas but also makes it feasible to recover the carbon black dust in the main bag filter without danger of explosion.

It has been found that the off-gas can be fired or burned successfully with only about 5 to 10 volume percent of excess air as compared with an excess of up to 200% when firing the dryer with natural gas. This results in a very low $O_2$ concentration, such as in the range of 0.2 to 0.3 volume percent, in the smoke stream passing to the bag filter when the effluent gas from the dryer is admixed therewith. When burning natural gas in the dryer in conventional manner with a large excess of air, the oxygen content of the combustion gas often runs as high as 5 to 7% thereby making it unsafe to introduce this gas into the bag filter in admixture with the combustible smoke passing thereto.

The pelleted product from the dryer is conventionally passed to a bagging room where the dried pellets are bagged for convenience in handling and shipping. A hood is placed over the bagging area with a vent line leading therefrom and a blower therein to dispose of the carbon black dust created by the bagging operation. In areas where carbon black dust is a menace, it is essential to recover this dust. Because of the extremely low concentration of $O_2$ in the smoke passing to the bag filter in admixture with the dryer effluent, it is feasible to also pass the relatively small volume of dust laden air stream from the bagging room hood to the bag filter for recovery of dust therefrom.

Another aspect of the invention comprises passing the dust-laden air from the bagging room hood into the fuel gas (off-gas) being fed to the dryer burners. In this manner, the vent gas from the bagging room supplies air for the combustion and also burns the suspended carbon black as fuel.

The elimination of the bag filter serving the dryer effects a saving of about $50,000 in plant equipment. The invention also eliminates need for a system for injecting the carbon black recovered from the auxiliary bag filter into the carbon black system. Thus, the invention renders the use of off-gas in the rotary dryers doubly advantageous in conserving fuel and in making it possible to pass the gas vented from the interior of the drum of the dryer into the bag filter so as to eliminate the extra expensive filter normally required in plants located in heavily populated areas. The invention also provides an advantageous use for the vented air from the bagging room.

A more complete understanding of the invention may be had by reference to the accompanying drawing which is a flow of the process and arrangement of apparatus of the invention.

Referring to the drawing, a series of carbon black reactors or furnaces 10 are supplied with air and hydrocarbon feed thru lines 12 and 14, respectively. Effluent smoke is passed thru line 16 into quench chamber 18 into which water is injected thru line 20 to knock the temperature of the smoke down to a suitable level for passing same thru the recovery system. The quenched smoke is passed via line 22 into bag filter 24 for separation of the stream into loose carbon black recovered in line 26 after passing thru micro-pulverizers 28 which connect with conduit 30, communicating thru a star valve with screw conveyor 32 which augers the black thereto. In bag filter 24, the denuded gas is recovered from the top of the filter compartments via a manifolding system 34 which feeds into line 36. Vent line 38 provides for venting any desired proportion of the off-gas from line 36. A portion of the off-gas is passed via line 40 into line 26 which functions as a pneumatic conveyor with the aid of blower 42 to feed the loose black into cyclone separator 44 via line 46. The loose black is delivered to surge vessel 48 from which it passes to wet pelletizer system 50.

The wet pellets are passed by conveyor 52 into a rotary drum dryer 54 which is heated by off-gas burned in burners 56. Fuel line 58 serving the burners connects with off-gas line 36 thru line 60. Supplemental fuel gas or oil may be injected thus auxiliary fuel line 62 into fuel line 58, if desired, to raise the B.t.u. content of the burner fuel.

A portion of the combustion gas formed by burners 56 passes around the drum 64 and out stack 66. Another portion of the combustion gas passes into the downstream end of the drum and out the feed end thereof thru conduit 68 to blower 70 which forces the effluent gas thus line 72 into smoke line 22 feeding the main bag filter 24. In conventional operation vent gas from the dryer drum is passed into an auxiliary bag filter 74 for recovery of the carbon black dust in the vent gas.

The dried pellets are passed via conveyor 76 to bagging room 78 which is provided with a hood 80 from which vent line 82 containing blower 84 leads to conduit 86. The vent gas from hood 80 contains entrained carbon black dust from the bagging operation and is passed either via line 88 to line 72 to the bag filter or via line 90 to fuel line 58, serving the dryer burners.

Off-gas blower 92 in line 36 may be eliminated by providing adequate pressure in line 22. Blower 94 in line 96 functions to repressure the outer walls of the bags in the filters, periodically, thru conduit system 98, taking off-gas from manifold 34 and injecting same into the interior of the bags thru the walls thereof to remove carbon black from the interior thereof.

Thus, it can be seen that the disclosed system and process eliminates bag filter 74 by utilizing normally wasted off-gas as fuel for the dryer burners so as to maintain a low oxygen concentration in the combustion gas from the burners. This makes it possible to introduce the dryer drum vent gas containing entrained carbon black dust into the main bag filter without danger of explosion. The system and process also makes novel use of the dust-laden vent gas from the bagging room hood by either passing this gas to the filter or to the dryer as air for its burners.

Certain modifications of the invention will become apparent to those skilled in the art and the illustrative details disclosed are not to be construed as imposing unnecessary limitations on the invention.

I claim:

1. A carbon black plant comprising carbon black producing means; an effluent smoke line from aforesaid means; carbon black recovery means including a bag filter in said smoke line; a carbon black recovery line from said bag filter; a wet pelletizer connected with said recovery line; a pellet dryer connected by conveyor line with said pelletizer and provided with a rotary drying drum within a furnace heated by fuel gas burners, there being means in said dryer, including a gas outlet, for passing a portion of the combustion gas from said burners thru the interior of said drum whereby the effluent gas from said drum entrains fine carbon black; a line connecting the gas outlet of said drum with the inlet end of said bag filter for recovering the carbon black from said effluent gas; a fuel gas line and an air line connected with said burners; an off-gas line from said bag filter connected with said fuel gas line for supplying a portion of the fuel for said burners; and a valve in said off-gas line and a valve in said air line for controlling the O₂ concentration in the combustion gas formed in said burners.

2. The plant of claim 1 including bagging means for said carbon black connected with the pellet outlet of said dryer; a hood over said bagging means having a vent line therein; a blower in said vent line; and conduit means connecting the outlet of said blower with said fuel line.

3. The plant of claim 1 including bagging means for said carbon black connected with the pellet outlet of said dryer; a hood over said bagging means having a vent line therein; a blower in said vent line; and conduit means connecting the outlet of said blower with the inlet of said bag filter.

4. A process for making carbon black and wet pelleting same comprising subjecting a hydrocarbon feed to partial combustion and pyrolysis to form a gaseous stream containing carbon black, passing said stream thru a carbon black recovery system including a bag filter to separately recover loose black and off-gas; passing the loose black to a wet pelletizer to form wet pellets; passing the wet pellets thru a gas fired rotary drum dryer to dry said pellets; passing off-gas from said bag filter to said dryer and burning same therein with about 5 to 10 volume percent of excess air, whereby the resulting combustion gas contains less O₂ than required to form an explosive mixture when admixed with aforesaid stream; passing resulting combustion gas thru the drum of said dryer in contact with carbon black therein whereby carbon black dust is entrained in said combustion gas; and passing the effluent gas from said drum, containing entrained carbon black, into said bag filter in admixture with said stream to recover the carbon black therefrom.

5. The process of claim 4 including passing dried pellets from said dryer to a bagging step wherein carbon black dust is suspended in the ambient air; venting said ambient air into a conduit and passing same, containing said dust, to said dryer with said off-gas to furnish a portion of said excess air; and burning the resulting mixture, including said dust, the relative volume of ambient air being controlled to maintain a concentration of O₂ in said stream below an explosive mixture, to heat said dryer.

6. The process of claim 4 including passing dried pellets from said dryer to a bagging step wherein carbon black dust is suspended in the ambient air; venting said ambient air into a conduit and passing same, containing said dust, into said bag filter to recover said dust.

References Cited in the file of this patent

UNITED STATES PATENTS

| | | |
|---|---|---|
| 2,457,962 | Whaley | Jan. 4, 1949 |
| 2,952,921 | Wood et al. | Sept. 20, 1960 |
| 2,973,249 | Haas | Feb. 28, 1961 |

UNITED STATES PATENT OFFICE
CERTIFICATE OF CORRECTION

Patent No. 3,102,005                                  August 27, 1963

Robert F. Dye

It is hereby certified that error appears in the above numbered patent requiring correction and that the said Letters Patent should read as corrected below.

Column 4, lines 45 to 47, strike out ", the relative volume of ambient air being controlled to maintain a concentration of $O_2$ in said stream below an explosive mixture" and insert the same, after "dust" in line 52, same column 4.

Signed and sealed this 21st day of April 1964.

(SEAL)
Attest:

ERNEST W. SWIDER

Attesting Officer

EDWARD J. BRENNER

Commissioner of Patents